July 7, 1964  HIKARU NISHIUCHI  3,139,701
METHOD OF CULTIVATING PLANT SEEDLINGS
Filed May 31, 1961

INVENTOR
H. Nishiuchi
ATTORNEYS

United States Patent Office 3,139,701
Patented July 7, 1964

3,139,701
METHOD OF CULTIVATING PLANT SEEDLINGS
Hikaru Nishiuchi, Sakai City, Japan, assignor to Takara Yoshi Co. Ltd., Osaka City, Japan, a corporation of Japan
Filed May 31, 1961, Ser. No. 113,785
2 Claims. (Cl. 47—58)

This invention relates to a method of cultivating plant seedlings.

The object and details of the invention will be apparent from the following description, when read in connection with the accompanying drawings, wherein.

Figure 1:
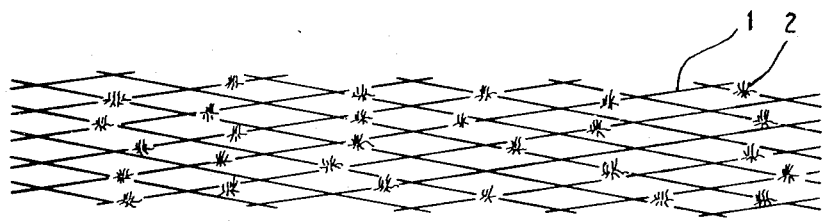
FIG. 1 is a plan illustrating the state of plant seedlings as cultivated on a wire network to be used according to the present invention.
Figure 2:
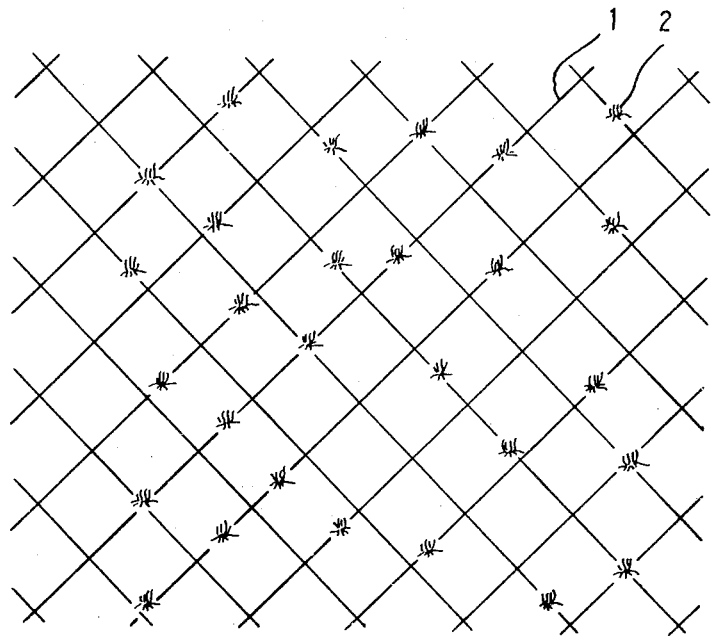
FIG. 2 is a plan illustrating the said network as spread out on the regular nursery ground.

The present invention concerns a plant cultivation method with the following features that a wire network is stretched as shown in FIGURE 1 from one end to reduce the space it occupies; seeds are sown or young seedlings are planted on the network, then covered with soil, watered and manured; when said seeds or seedlings sprout or grow up taking root around the said network, said network is dug out and shifted to the regular nursery ground with the wire expanded fully as shown in FIGURE 2; thus many grown-up seedlings can be successfully transplated in one operation.

According to the present invention, as illustrated in FIG. 1 the wire network 1 is stretched in one direction and as the result the wire mesh is diagonally flattened, turning the whole network into a narrow band of reduced area. Over this narrow band, for instance; grass seeds are sown or cabbage seedlings are planted; covered with soil, watered and manured.

Then said seeds or seedlings 2 come to sprout or grow up taking root around the wire 1. When the network is dug out, the grown-up seedlings are already securely attached to said network and will not fall off. Next, said network with said seedlings clinging to it is spread out over a flower-bed or embankment in the case of lawn or over a nursery field in the case of cabbage; and the seedlings will be spaced adequately one from another as illustrated in FIG. 2.

Also the network according to the present invention may be pasted over with a sheet of weak paper that can easily break when wet with water and the whole thing may be applied as a cultivator of seedlings. In this case, said paper may be pasted to strong, water-resistant strings which are criss-crossed or woven in a helical form.

For application of the present invention as said cultivator of seedlings, first the network covered with said paper is laid on the ground and seeds are sown in rows, or seedlings are planted, along the meshes of said network; covered with soil and watered.

The seedlings that have sprouted and taken root will then penetrate the wetted and weakened paper and grow up through it, with their roots woven around said strings. Thereupon, said cultivator is dug out, put on an appropriate board and spread out in one direction with one end of the string fixed on the ground. Thereby the weakened paper is broken and the network is expanded with the roots clinging around it; accordingly the seedlings are spaced at proper intervals. Then the seedlings together with the strings are covered with soil to finish the transplantation.

Thereby the water-resistant strings will not snap off.

Thus, the object of the present invention is to effect the transplantation of seedlings cultivated in a limited space of a narrow nursery bed to the regular nursery ground in one simple operation by utilizing an expandable network made of wire, string, or other comparable elongated elements.

What is claimed is:

1. The method of cultivating plants which comprises the steps of disposing on the ground in its contracted position a network of elongated elements which may be expanded and contracted in area, growing plants within the area of said network which cling thereto, removing said network from the ground with said plants clinging to it, subsequently expanding said network, and replanting said plants with said network in its expanded position.

2. The method of cultivating plants which comprises the steps of disposing on the ground a supporting member which is extended to less than its full length in at least one direction, growing plants about said member so that they cling thereto, removing said member and plants from the ground, extending said member to a greater length, and replanting said plants with said member in its extended position.

References Cited in the file of this patent

UNITED STATES PATENTS

| | | |
|---|---|---|
| 1,078,682 | Jagenberg | Nov. 18, 1913 |
| 1,171,558 | Taylor | Feb. 15, 1916 |
| 1,873,666 | Roy | Aug. 23, 1932 |
| 1,994,553 | Wolcott | Mar. 19, 1935 |
| 2,029,343 | Sperr | Feb. 4, 1936 |
| 2,309,702 | Kirschenbaum | Feb. 2, 1943 |
| 2,647,850 | Reinhard | Aug. 4, 1953 |
| 2,902,795 | Heigl | Sept. 8, 1959 |
| 2,916,854 | Heigl | Dec. 15, 1959 |

FOREIGN PATENTS

| | | |
|---|---|---|
| 386,280 | Great Britain | Jan. 12, 1933 |
| 552,448 | Italy | Dec. 3, 1956 |
| 261,559 | Switzerland | Aug. 16, 1949 |